UNITED STATES PATENT OFFICE.

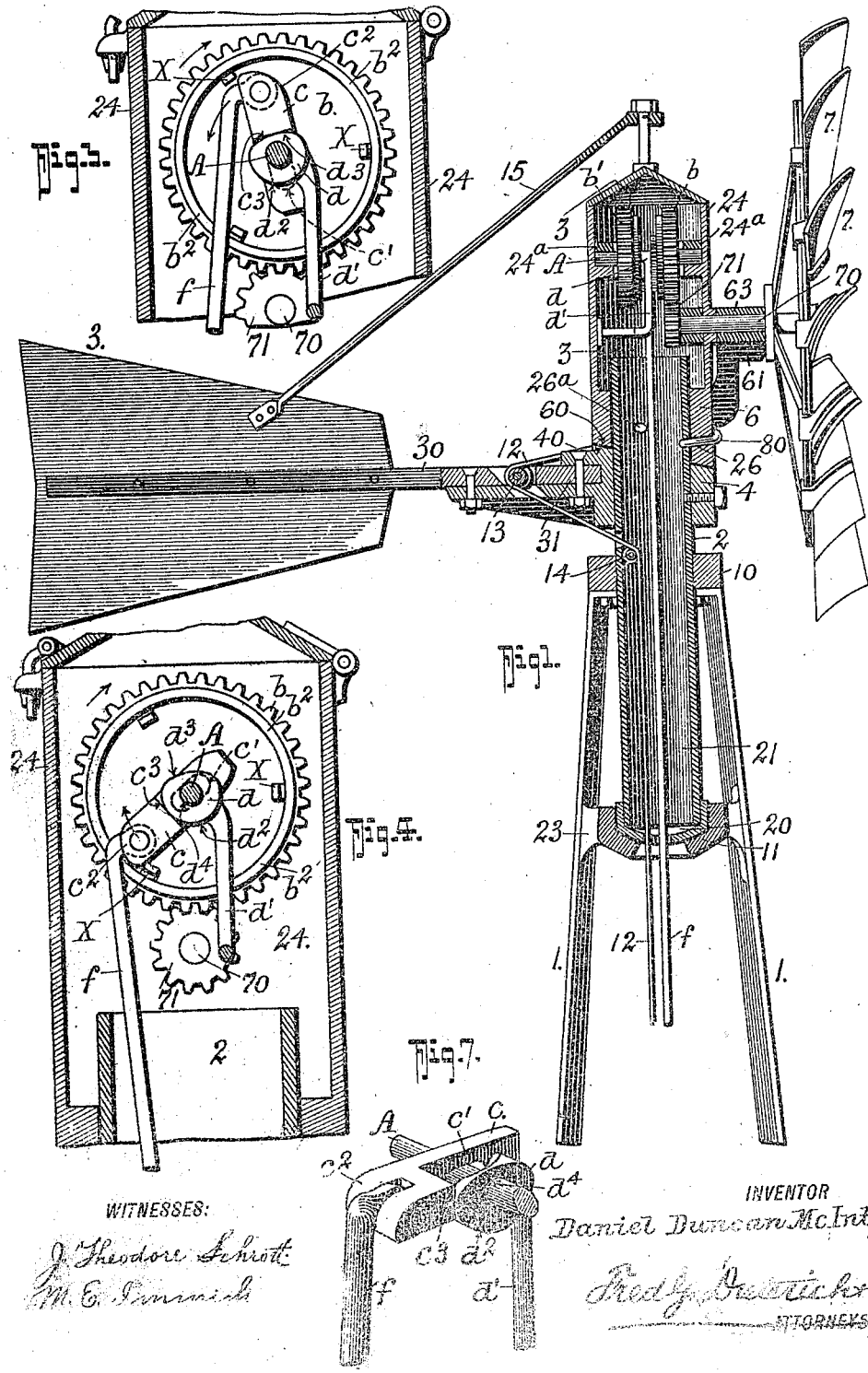

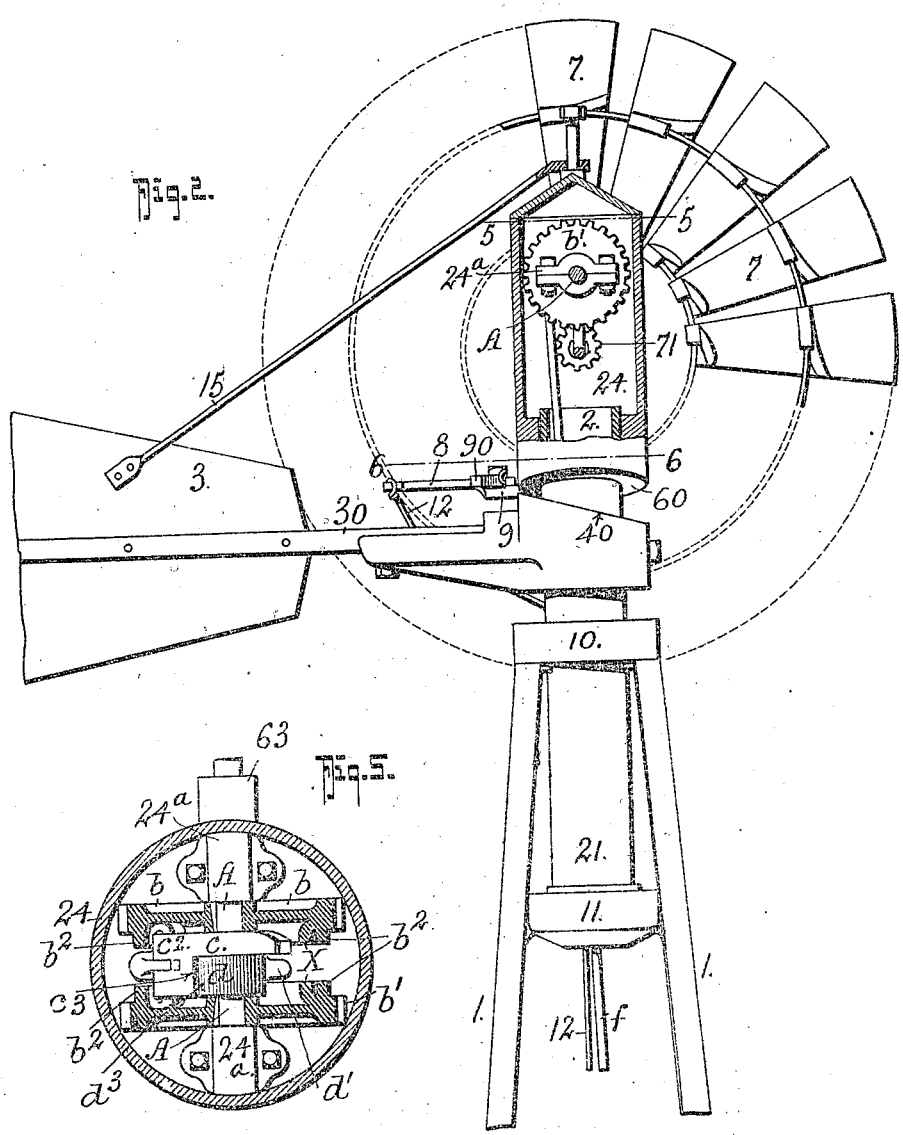

DANIEL DUNCAN McINTYRE, OF BUCKLIN, KANSAS.

WIND-MOTOR.

949,027.   Specification of Letters Patent.   Patented Feb. 15, 1910.

Application filed February 25, 1909. Serial No. 479,939.

*To all whom it may concern:*

Be it known that I, DANIEL DUNCAN MC-INTYRE, residing at Bucklin, in the county of Ford and State of Kansas, have invented a new and Improved Wind-Motor, of which the following is a specification.

My present invention has for its object to provide an improved construction of wind motor, that can be economically built, is of a simple construction, in which the several parts have such coöperative connection and arrangement as to insure durability and positiveness in action, in which the entire motor and wheel structure is of less weight than the ordinary types of wind wheels, and further in which the operative parts are rigidly held in connection when the wheel is adjusted, in or out of gear.

With the above objects in view, and other objects that will be hereinafter pointed out, my invention, in its generic nature comprehends an improved construction of wind motor gearing having such connection with the pump rod, whereby, through the medium of a drive pinion of very small diameter, the rod is intermittently raised and dropped a plurality of times (three in the present showing of my invention) while the wheel is making a single revolution, the drop motion of the rod being effected by its own weight.

Again, my invention includes a connection between the pump rod actuating motor gearing and the wind wheel that automatically moves into an operative position when the wheel is manually released from a locked position edgewise to the wind, the said wheel being also specially mounted whereby it returns to its wind facing position under its own weight.

In its still more subordinate features my invention consists in certain details of construction and peculiar combinations of parts, all of which will be hereinafter fully explained, specifically pointed out in the appended claims and illustrated in the accompany drawing, in which:

Figure 1, is a side elevation of my present form of wind motor the casing for the motor gearing and other parts being shown in section, the wind wheel being faced to the wind in the operative position. Fig. 2, is a similar view, the wind wheel with its gearing being at right angles to the position shown in Fig. 1 and at rest. Fig. 3, is a transverse section of the motor gearing taken substantially on the line 3—3 on Fig. 1, the pump rod lifting pawl or dog being shown at its uppermost position, and just released from the lifting tappet that carried it to the said position. Fig. 4, is a view similar to Fig. 3, the lifting pawl being at its dropped position and engaged by one of the lifting tappets. Fig. 5, is a horizontal section of the motor gearing taken on the line 5—5 on Fig. 2. Fig. 6, is a cross section on the line 6—6 of Fig. 2. Fig. 7, is a detail perspective view of the pump rod lifting pawl hereinafter particularly referred to.

In the practical application of my present invention, the wind motor mechanism is mounted on a supporting framing 1 of any approved construction, and the top or bed of which includes an apertured bearing plate 10, as clearly shown in Fig. 1, by reference to which it will be observed the wind motor includes a tubular casing 2, the lower end 21 of which is closed by a cap 20 that fixedly rests in a stirrup 11 supported by suitable arms or brackets 23 to the motor derrick 1.

3 designates the wind vane, the arm 30 of which is fixedly connected to a bearing collar 4, fixedly mounted on the tubular casing 2, to turn therewith. To relieve the connection 31 of undue strain a brace rod 15 is secured to the vane and to the top of a housing 24 that rides vertically on the upper end of the tubular casing 2 at times, said housing 24 being enlarged at the upper end to provide a motor gear inclosing chamber.

The bearing collar 4 has its upper face inclined at an angle with respect to the axis of the casing to, form a cam face 40, and on this face is mounted a hub 6, whose lower or bearing face 60 is similarly inclined, the object of inclining the contacting faces of the members 4 and 6 being presently explained.

The hub 6 has a laterally projected bracket 61 that extends upwardly parallel with the casing 2, and its upper end forms a bearing 63 for the shaft 70 of the wind wheel 7, which may be of any approved construction, since the wheel, *per se*, forms no specific feature of this invention.

The hub 6 has an aperture 64 adapted to be in alinement with either of the two apertures 26—26ª in the tubular casing 2, one of which 26ª is in a higher plane than the other, see Fig. 1.

To the latch 8, whose pintle 80 is made integrally therewith is connected at its outer end an actuating rope 12, which passes downwardly over a pulley 13 in the vane into the tubular casing 2, again over a guide pulley 14 and from thence to a point for convenient manipulation. In order that the intended purposes of the latch member 8 may be effected, a lug 90 on a bearing 9 is provided so that when the cable 12 is pulled, pintle 80 will be disengaged from aperture 26, latch 8 will abut lug 90 and the complete casing 24 and its mechanism may be drawn to a position at right angles to that shown in Fig. 1 and the motor be caused to rest. The hub 6 will then have ridden up the incline of hub 4 and be in position shown in Fig. 6 and lock the casing 24 in the aforesaid inoperative position. A spring 92 keeps the pintle 80 in engagement with either aperture 26 or 26ª.

By reason of constructing the several parts as shown and described it will be readily apparent by referring to Figs. 1 and 2 of the drawings that when the parts are as in Fig. 1 the motor gearing will be in operation in the housing 24 and the latch 8 will be in engagement with the lowermost one 26, of the apertures in the casing 2 and by reason thereof the mechanism is held in an operative position, that is, the motor gearing will be actuated as the wheel with its pinion revolves.

To throw the mechanism out of gear, is quickly accomplished by the operator pulling on the cable 12, it being understood the parts are now as in Fig. 1, the latch devices shown in detail in Fig. 6 being now disposed in a position at right angles to that shown in Fig. 6 with the latch end 80 engaging the aperture 26 in the member 6 which is now located as shown in Fig. 1. The first pull strain on the cable releases the latch 8, the continued pull turns the hub 6 with the wheel and its pinion 71 around the casing 2, and by reason of the inclined bearing faces 40 and 60, the hub with the wheel rises as it turns to the position shown in Fig. 2, at which time the latch 8 slips into a locked engagement with the uppermost aperture 26ª in the housing 2, and holds the wheel with its pinion and the hub 6 locked to the position shown in Fig. 2, at right angles to that shown in Fig. 1.

A designates a short shaft loosely mounted in the oppositely disposed bearings 24ª—24ª on the housing 24, and the shaft has, keyed thereon, a pair of oppositely disposed gears $b$—$b'$ of like construction, one of which is mounted to be engaged by the pinion 71 of the wind wheel 7, motion being imparted to the parts when the mechanism is in the wind facing position or that shown in Fig. 1 it being understood that when the wind wheel and the hub 6 are up to the inoperative position shown in Fig. 2, with the wind wheel edgewise to the wind, to bring the wheel and coöperating parts to an operative position, it is only necessary to pull on cable 12 to release latch 8 from casing 2, which then allows the hub 6, and wheel 7, to drop under their own weight, it being also clear that by reason of the inclined faces 40 and 60 the hub 6 will take a quarter turn, as it falls, turning wheel 7 with it.

Each gear $b$—$b'$ has an internal flange $b^2$—$b^2$ and a series of tappets X—X, three being shown that bend out flush with the outer edge of the flanges $b^2$, as clearly shown in Fig. 5.

On the shaft A between the flanges of the gears $b$—$b'$ is shiftably mounted a pawl $c$ before termed the pump rod lifting pawl, and which is best shown in Figs. 3, 4 and 7, by reference to which it will be seen pawl $c$ consists of a member having an elongated slot $c'$ for riding on the shaft A and a bifurcated head $c^2$, the inner part of which forms a bearing shoulder $c^3$ for engagement with a cam head $d$, fixedly held with respect to the shaft A, it being mounted on a bracket $d'$ secured within the housing 24 and having an aperture $d^4$ for the shaft A that turns freely in said aperture.

By referring now more particularly to Figs. 3 and 4 it will be noticed the members $c$—$d$ and the tappet carrying gear $b$ are relatively so arranged that, assuming the parts to be as in Fig. 4, and the gear $b$ traveling in the direction of the arrow under impulse from the wind wheel pinion 71, the lowermost tappet X engages the outer edge of the pawl $c$ and carries it up with it, said pawl turning with the shaft A and gear $b$ and in doing so, it pulls the pump rod $f$ attached thereto upwardly until the pawl $c$ nearly reaches the vertical position.

It should be stated that the cam $d$ has one face $d^2$ so arranged that by reason of shoulder $c^3$ engaging it, the pawl $c$ is held in a locked engagement with the tappet, that is, it cannot slide on the shaft A and such locked engagement is maintained until pawl $c$ approaches the vertical position when its shoulder $c^3$ begins to engage another face $d^3$ of cam $d$ which has such shape that pawl $c$, as soon as its shoulder begins to engage face $d^3$, begins to recede or drop down with respect to shaft A until it is nearly vertical, see Fig. 3, when it recedes or drops down far enough so it slips by the tappet X and being thus released, the weight of pump rod and its valve causes the pump to make its down stroke, it being understood that if necessary the pump rod pivotally joined at the upper end to the bifurcated head of pawl $c$ may be weighted to effect the desired rapidity of its down stroke. After the pump rod has been dropped as stated, pawl $c$ resumes the position shown in Fig. 4 ready to be engaged by the next tappet X.

In the drawings I have shown three tappets on the lift gear to provide, as it were, three strokes of the pump to one rotation of the said gear, but it is manifest that the number of strokes of the pump rod, the length of stroke of the pump may be varied and regulated by the diameter of the gear $b$ that meshes with pinion 71 and the number of tappets carried thereby.

While I prefer for a simple type of wind wheel motor, to arrange the several parts as shown and described, the said parts may be readily varied or modified to adapt them to other types of wind wheels, without departing from the generic ideas of my invention or the scope of the appended claims.

Having thus described my invention, what I claim is:—

1. In a wind motor, the combination with the wind wheel the standard having a housing and the pump rod having a crank portion at the upper end that extends into the housing, of a mechanism operable by the rotary movement of the wind wheel for intermittently picking up and releasing the crank end of the pump rod as the wheel rotates.

2. The combination with the standard, a motor gearing thereon for actuating the pump rod, and a horizontal bearing on the standard inclined to the vertical axis of the standard; of a hub having an inclined bottom bearing face for engaging the inclined face of the standard bearing, a wind wheel carried by the hub having its shaft pinion in mesh with the motor gearing, and means for rotating the hub on the bearing, and simultaneously carrying the wheel laterally and vertically to render the pump rod actuating means inoperative.

3. In a wind motor, the combination with a standard, a wind wheel shaft, a motor gearing mounted thereon, said gearing including a drive pinion on the wind wheel shaft, a pump rod, a lifter pivotally mounted on the standard and connected with the pump rod, and means that forms a coöperative part of the motor gearing for intermittently engaging the lifter as the wind wheel shaft and pinion rotates.

4. The combination with the standard having a housing at the upper end, the wind wheel having its shaft extended into the housing and carrying the drive pinion, a motor gearing that includes a shaft mounted transversely in the housing, a pawl pivotally mounted on the shaft, and lengthwise slidable thereon, the pump rod connected to one end of the pawl, a gear wheel mounted on the shaft that meshes with the drive pinion, a tappet on the wheel for engaging the outer end of the pump rod holding pawl to carry it upward, and a means for releasing the pawl from the tappet when the pawl approaches a vertical position whereby to allow the pump rod to drop.

5. In a wind motor mechanism, the combination with the standard, the wind wheel and the pinion on the wind wheel shaft; of a cam fixedly mounted on the standard, a lifter pawl that coöperates with the cam and is pivotally mounted, the pump rod connected to the lifter pawl, a gear that meshes with the wheel pinion, having members for intermittently engaging and lifting the pawl, the said cam and pawl being relatively arranged whereby to trip the pawl to disengage it from the members in the gear that lift the said pawl.

6. In a wind motor, the combination with the standard, a wind wheel, a drive pinion mounted thereon, a gear mechanism on the standard that meshes with the wind wheel shaft pinion, the said mechanism including tappets for lifting the pump rod at times, and a fixedly held cam for releasing the pump rod from the tappets at times.

DANIEL DUNCAN McINTYRE.

Witnesses:
A. W. PADGITT,
CHAS. ROBINSON.